US012475799B2

(12) United States Patent
Svatek et al.

(10) Patent No.: US 12,475,799 B2
(45) Date of Patent: Nov. 18, 2025

(54) SYSTEM AND METHOD FOR ENCODING MISSION CONFIGURATION AND PASSENGER EXPERIENCE DATA FOR URBAN AIR MOBILITY (UAM) PASSENGER TRANSPORT

(71) Applicant: ARINC Incorporated, Annapolis, MD (US)

(72) Inventors: Boe A. Svatek, Cedar Rapids, IA (US); Nicholas J. Liberko, Marion, IA (US); Patrick Cosgrove, Cedar Rapids, IA (US); Andrew Donnelly, Baltimore, MD (US)

(73) Assignee: ARINC Incorporated, Annapolis, MD (US)

( * ) Notice: Subject to any disclaimer, the term of this patent is extended or adjusted under 35 U.S.C. 154(b) by 227 days.

(21) Appl. No.: 18/128,060

(22) Filed: Mar. 29, 2023

(65) Prior Publication Data

US 2024/0331551 A1 Oct. 3, 2024

(51) Int. Cl.
*G08G 5/34* (2025.01)
*G05D 1/00* (2024.01)
*G08G 5/26* (2025.01)

(52) U.S. Cl.
CPC .............. *G08G 5/34* (2025.01); *G05D 1/0022* (2013.01); *G08G 5/26* (2025.01)

(58) Field of Classification Search
CPC .......... G08G 5/34; G08G 5/26; G08G 5/0039; G08G 5/25; G08G 5/0034; G05D 1/0022; G06T 7/73
See application file for complete search history.

(56) References Cited

U.S. PATENT DOCUMENTS 8,892,273 B1 11/2014 Raghu et al.
9,912,384 B1 3/2018 McClatchy et al.
(Continued)

FOREIGN PATENT DOCUMENTS

EP 2289027 A1 3/2011
EP 3776448 A4 11/2021
EP 4011774 A1 6/2022

OTHER PUBLICATIONS

European Patent Office, Extended European Search Report received in EP Application No. 24166414.3, Jun. 13, 2024, 8 pages.

*Primary Examiner* — Christian Chace
(74) *Attorney, Agent, or Firm* — Suiter Swantz IP (57) ABSTRACT

A system and method for transporting passengers via uncrewed aircraft systems (UAS) receives passenger requests for transport between origin and destination points. Based on the request a transport plan is generated for each passenger, identifying the passenger, assigning a UAS and including a flight plan (which includes flight instructions and a communications plan for the UAS control system). Based on the transport plan one or more encoded flight plan datasets are generated. Each encoded dataset is downloadable to and displayable by the passenger's portable computing device, and scannable and decodable by reader devices at the origin and destination ports and aboard the UAS. Scanning an encoded dataset both grants the passenger access to the origin port and UAS and confirms the passenger's presence. Further, each assigned UAS downloads from the decoded flight plan data the necessary configuration data to fulfill its portion/s of the flight plan.

18 Claims, 4 Drawing Sheets

(56) References Cited

U.S. PATENT DOCUMENTS

| | | |
|---|---|---|
| 10,243,931 B2 | 3/2019 | Latorre-Costa |
| 10,707,951 B2 | 7/2020 | Hathaway |
| 11,195,243 B2 | 12/2021 | Singh |
| 11,407,523 B2 | 8/2022 | Ping |
| 11,445,231 B1 | 9/2022 | Watson et al. |
| 2016/0320194 A1* | 11/2016 | Liu ................... G01C 21/3438 |
| 2016/0321566 A1* | 11/2016 | Liu ....................... G06Q 10/02 |
| 2017/0197710 A1* | 7/2017 | Ma .......................... G06F 21/31 |
| 2018/0002017 A1* | 1/2018 | Abeles ...................... B64F 5/60 |
| 2019/0325757 A1 | 10/2019 | Goel et al. |
| 2020/0026309 A1 | 1/2020 | Ma |
| 2020/0228337 A1 | 7/2020 | Sumien et al. |
| 2020/0311843 A1 | 10/2020 | Park |
| 2021/0122489 A1 | 4/2021 | Maraj et al. |
| 2022/0242589 A1 | 8/2022 | Pham et al. |
| 2022/0309932 A1 | 9/2022 | Pokorny et al. |

* cited by examiner

SYSTEM AND METHOD FOR ENCODING MISSION CONFIGURATION AND PASSENGER EXPERIENCE DATA FOR URBAN AIR MOBILITY (UAM) PASSENGER TRANSPORT

BACKGROUND

Urban Air Mobility (UAM) or Advanced Air Mobility (AAM) operations provide short-hop point-to-point transportation of passengers within an urban area or like locality via uncrewed aircraft systems (UAS; also uncrewed air vehicles (UAV)). UAM operations require information exchange for passenger authentication and safe flight operations (UAS are "uncrewed" in that they do not carry qualified pilots onboard). However, the data transport mechanisms required for this information exchange may add additional weight that hampers the efficiency of the UAS/UAV, where the lightest possible vehicle (including any passengers and cargo) is generally desirable (e.g., according to power consumption and/or speed metrics).

SUMMARY

In a first aspect, a method for transporting passengers via uncrewed aircraft systems (UAS) is disclosed. In embodiments, the method includes receiving, via an urban air mobility (UAM; also advanced air mobility (AAM)) system, a request from a passenger for air transit from a point of origin to a destination. The method includes generating a transport plan based on the transit request, the transport plan identifying the requesting passenger and providing a flight plan for one or more assigned UAS to transport the passenger from the origin to the destination, the flight plan including flight instructions executable by a control system aboard the assigned UAS and a communications plan allowing the assigned UAS to maintain communications with ground-based control facilities inflight. The method includes generating, via one or more visual encoding schemes, an encoded transport plan scannable and decodable by reader devices (e.g., at an origin vertiport or airport wherein an assigned UAS will depart along the flight path, and/or aboard the UAS itself), where scanning the encoded transport plan may grant the passenger access to the origin port or the UAS; confirm the passenger as present at the origin port or aboard the UAS, provide the UAS control system with the necessary configurations to execute its assigned portion of the flight plan, and confirm the arrival of the UAS and/or passenger at a destination vertiport or airport (e.g., an intermediate or terminal destination of the flight plan, via a reader device at said destination). The method includes providing the encoded flight plan data to the passenger, e.g., via download to a portable computing device. physical hard copy, and/or other formats scannable by the reader devices.

In some embodiments, the flight plan includes ground control instructions intended for ground crew at the origin and/or destination ports.

In some embodiments, the ground control instructions include maintenance data and/or weight and balance data for one or more UAS assigned to a flight plan.

In some embodiments, the transport plan includes a ground transport plan via which the passenger may be picked up and/or transported from a pickup point (e.g., the passenger's home or a third place) to the origin port and/or from the destination port to a drop-off point. For example, the ground transport plan may be obtained by scanning the encoded flight plan data via a reader device in a partially or fully autonomous ground vehicle and may include ground transport instructions for configuring the ground vehicle to transport the passenger to the origin port or ultimate destination. Further, the decoded ground transport instructions may grant the passenger access to the ground vehicle, confirm for the UAM system that the passenger is aboard the ground vehicle, and confirm that the passenger has been transported to their ultimate ground destination.

In some embodiments, an assigned UAS is semi-autonomous, e.g., operated via wireless link to the UAS by a remotely located human operator, and the flight instructions included in the encoded flight plan data are executable by the remote operator.

In some embodiments, an assigned UAS is fully autonomous, and the flight instructions included in the encoded flight plan data are downloaded to an onboard control system to configure the control system for autonomous operation of the UAS (e.g., flight operations, communications operations) according to the flight plan.

In some embodiments, the encoded flight plan data includes passenger experience data, e.g., a seat assignment aboard one or more assigned UAS for the requesting passenger, whereby each seat includes a display screen or surface dedicated to the passenger (e.g., via which the passenger may communicate with ground-based crew or remote operators).

In some embodiments, the method includes, when the passenger's arrival at an origin port is confirmed, reviewing and validating the encoded flight plan data to determine that all aspects of the associated transport plan may be fulfilled as originally intended.

In some embodiments, the method includes, when the review determines that one or more aspects of the transport plan are invalid, the method includes modifying the transport plan based on one or more change requests, generating new encoded flight plan data to reflect the modifications to the transport plan, and providing the new encoded flight plan data to the passenger. For example, change requests may be initiated by a requesting passenger (e.g., via their portable device, via a reader device at the origin port) or by the UAM system. The passenger may be provided with the opportunity to accept or reject all or some modifications to the flight plan.

In a further aspect, a system for providing encoded access control, mission data, and passenger experience data for UAM/AAM passenger transport is also disclosed. In embodiments, the system includes a UAM controller for receiving passenger requests for air transport from an origin to a destination via one or more UAS. Based on a passenger request, the controller generates a transport plan uniquely identifying each passenger within the UAM system and assigning one or more UAS to transport them from the origin to the destination (e.g., via vertiports or airports at the origin, destination, and/or one or more waypoints therebetween). The transport plan includes a flight plan from the origin to the destination (and any included waypoints) and relevant passenger experience (PaxEx) data associated with relevant passenger preferences or needs (e.g., seating, dietary, safety, accessibility, passenger confidence). The flight plan further includes flight configuration instructions via which the assigned UAS may be configured for flight operations in fulfillment of the flight plan and a communications plan via which the assigned UAS and any passengers aboard may maintain communications with ground-based remote operators and/or control facilities. The controller encodes the transport plan into one or more encoded flight plan datasets, each dataset unique to a requesting passenger (e.g., according to visual encoding schemes) and provides the encoded flight plan datasets to the requesting passenger, e.g., via download to a mobile computing device via which the encoded flight plan data may be displayed by the passenger for scanning/decoding by reader devices, e.g., at the origin port, aboard the assigned UAS, at the destination port. By scanning and decoding the encoded flight plan data, the passenger may be granted access to an origin port or assigned UAS and their presence confirmed there by the UAM system (e.g., so departure preparations may commence). Further, an assigned UAS may download a portion of the decoded flight plan data so that the UAS control system can configure the UAS to execute its assigned portion/s of the flight plan. Finally, the encoded flight plan data may be scanned at the destination port to confirm passenger arrival and/or complete fulfillment of a flight plan or of a portion thereof.

In some embodiments, the encoded flight plan data includes ground control instructions decodable by a reader device at an origin port or destination port and forwarded to ground support crew.

In some embodiments, the ground control instructions include maintenance data and/or weight and balance data for one or more UAS assigned to a particular flight plan.

In some embodiments, the transport plan (and therefore the encoded flight plan data) includes a ground transport plan via which the requesting passenger may be transported via one or more ground vehicles, e.g., from a pickup point to an origin port, between waypoints, from a destination point to a final drop-off point. For example, the encoded flight plan data may be scannable/decodable by ground vehicles (e.g., including semi-autonomous or fully autonomous vehicles) to provide passenger access to the ground vehicle, confirm the passenger's presence aboard the ground vehicle, and confirm the passenger's arrival at their ground destination.

In some embodiments, the encoded flight plan data includes flight instructions executable by a remote operator of an assigned semi-autonomous UAS, e.g., via wireless link to the UAS control system from a ground control facility where the remote operator is located.

In some embodiments, the encoded flight plan data includes flight instructions downloadable and executable by an onboard control system of a fully autonomous UAS without a remote human operator.

In some embodiments, the encoded flight plan data includes seat assignments for the requesting passenger aboard the assigned UAS. For example, the passenger may be assigned a particular seat aboard the UAS and a dedicated display screen or surface for the assigned seat, whereby the passenger may communicate with ground control facilities or view in-flight entertainment (IFE) content and safety instructions.

In embodiments, when a reader device confirms a passenger is present at the origin port by scanning the passenger's encoded flight plan data, the UAM system may review and validate the associated transport plan to determine if every aspect of the transport plan can still be fulfilled as requested.

In embodiments, when one or more aspects of the transport plan are determined to be no longer valid (i.e., the transport plan is partially or fully invalid), the UAM system modifies the transport plan according to change requests. For example, change requests may be submitted by the requesting passenger (e.g., via the passenger's portable device or the reader device at the origin port) or initiated by the UAM system. The UAM system partially or fully re-encodes the modified transport plan to reflect any modifications, and provides the new encoded flight plan data to the passenger (e.g., to the portable device or via the reader device, via which the passenger may also download the new encoded flight plan data or receive as a hard copy).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following:

A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to systems and methods for safe, secure, and compact transfer of passenger and flight data within an Urban Air Mobility (UAM) network. For example, passengers are provided with a securely encoded targeted data package that travels with them, providing access to UAM ground facilities and aboard a UAM aircraft. Further, the encoded data package carried by each passenger provides the aircraft with any necessary configuration data to transport each passenger to their destination.

Figure 1:
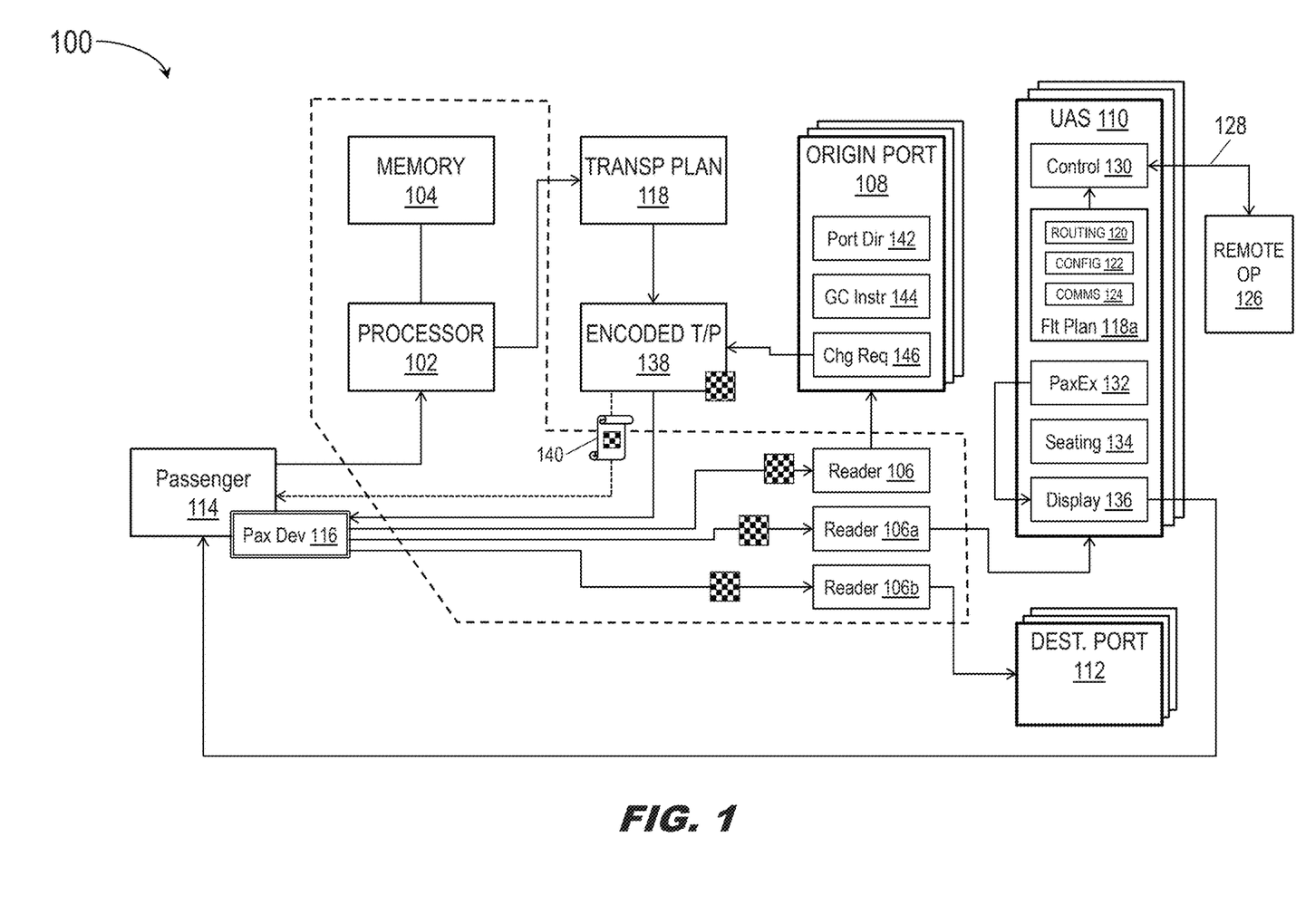
FIG. 1 is a block diagram illustrating a system for encoded access control and efficient data transfer within an Urban Air Mobility (UAM) system according to example embodiments of this disclosure.

Referring now to FIG. 1, a UAM system 100 (e.g., UAM network) is shown. The UAM system 100 may include one or more control processors 102, memory and/or data storage 104, one or more reader/scanner devices 106, origin ports 108, uncrewed aircraft systems 110 (UAS), and destination ports 112.

In embodiments, a passenger 114 may submit a transport request to the UAM system 100 for airborne transportation from the origin port 108 to the destination port 112 at or near a particular time. For example, the passenger 114 may carry a mobile computing device 116 (e.g., passenger device; smartphone, tablet, phablet) equipped with processors, display, and wireless communication components. The passenger may engage with a website, application, virtual agent, or other aspect of the UAM system 100 to submit a request for airborne transportation through the UAM system from a particular origin port 108 to a particular destination port 112. In some embodiments, origin ports 108 and destination ports 112 may be purpose-built ground-based facilities designed for the launch, landing, storage, maintenance, and/or control of a UAS 110 or fleet thereof. For example, origin ports 108 and destination ports 112 may be "vertiports", or facilities designed for vertical takeoff and landing (VTOL) of a UAS 110, which may include rotorcraft configured for VTOL maneuvers (ascent, descent, hover, rotate), level flight (e.g., once a safe cruising altitude is reached), and transitions therebetween. In some embodiments, the UAM system 100 may be configured for more seamless transportation not restricted to purpose-built facilities, e.g., the origin port 108 and destination port 112 may be requested by the passenger 114 as any space where it is feasible to pick up and drop off the passenger (e.g., at or near the passenger's home, a public area suitable for VTOL operations).

The memory 104 may be configured for storage of any data relevant to operations of the UAM system 100, e.g., traffic data, weather data, routing data, passenger data, maintenance data, contingency management data, or other status data relevant to each UAS 110, as well as encoded instructions executable by the processors 102. In embodiments, when a transport request is received from a passenger 114, the UAM system 100 may generate a transport plan 118 for the passenger via which the transport request may be fulfilled. For example, based on available information about the network of origin ports 108, UAS 110, and destination ports 112, the transport plan 118 may include a flight plan 118a mapping a route 120 from the desired origin port 108 to the desired destination port 112 whereby one or more UAS 110 may be assigned to transport the passenger 114. Each UAS 110 may be configured for simultaneous transport of a particular number of passengers 114 (e.g., four, six, eight) and thus a particular UAS may or may not be available to transport the passenger along a particular route at a particular time. In embodiments, the flight plan 118a may generate a route from an origin port 108 to a destination port 112 based on available information relevant to weather and wind conditions, air traffic patterns, regulatory information with respect to approved and geofenced airspaces, and/or passenger preferences.

In embodiments, the transport plan 118 may further include any configuration data 122 and/or communications data 124 necessary for an assigned UAS 110 to transport the passenger 114 via the generated route 120. For example, the UAS 110 may be uncrewed in that it may not carry a dedicated pilot as an onboard operator. In some embodiments, if the UAS 110 does not carry an onboard pilot, all flight operations of the UAS 110 may be executed and monitored by a remote operator 126. For example, the remote operator 126 may be located remotely from the assigned UAS 110 (e.g., at the origin port 108, at the destination port 112, or at some other ground-based control facility) and may operate the UAS 110 via a secure command and control (c2) wireless datalink 128 to the onboard control system 130 of the UAS. In embodiments, the configuration data 122 may provide the remote operator 126 with all information necessary for direct control of the UAS 110. For example, configuration data 122 may include a control interface specific to a particular aircraft type; weight and balance information (e.g., an accurate weight of the UAS 110 including its cargo and passengers 114); maintenance information; and current wind, weather, and/or air traffic information along the route 120 provided by the flight plan 118a. Further, the communications data 124 may include information about communications protocols and/or frequencies to be used for communications with ground control facilities or with any other proximate aircraft along the prescribed route. For example, the communications data 124 may indicate dedicated communications channels to be used inflight; alternatively, the communications data may instruct the control system 130 to tune to a default or guard communications channel whereby further instructions may be provided.

In embodiments, once the UAS system 100 has cleared the UAS for takeoff (e.g., having verified that all passengers 114 are aboard who should be aboard and that the control system 130 has processed the available routing data 120, configuration data 122 and/or communications data 124 carried aboard by each passenger), the remote operator 126 may directly control ascent, cruise, maneuvering, and descent/landing of the UAS 110 through direct interface with the control system via the C2 wireless datalink 128. In some embodiments, the UAS 110 may be a fully autonomous vehicle configured for self-management (e.g., via the control system 130) of takeoff, cruise, and landing operations without a remote operator 126 (except, e.g., if emergency conditions mandate intervention by a human operator).

In embodiments, the transport plan 118 may include passenger experience (PaxEx) data 132. For example, PaxEx data 132 may include information uniquely identifying the requesting passenger 114, passenger preferences (with respect to, e.g., refreshments (such as any relevant dietary restrictions), in-flight entertainment (IFE; personal device connectivity, permissions and/or authorizations)), seating (configurations, preferred settings or comfort levels), passenger accessibility (relevant accommodations and/or support needs)), passenger safety (e.g., safety instructions and procedures), and any data assigned to the requesting passenger. The passenger 114 may be assigned a particular UAS 110 (or, in some embodiments, a sequence of two or more UAS if the routing 120 requires a change of vehicle) and a particular seat 134 within the assigned vehicle. In some embodiments, the PaxEx data 132 includes passenger confidence data, e.g., to reassure passengers 114 that their accommodations aboard the UAS 110 align with their original transport request). For example, each assigned seat 134 within the UAS 110 may include a dedicated display 136 (e.g., display screen) for the display of IFE and/or passenger confidence information. In some embodiments, passenger confidence information may further be configured to allow passengers 114 to contact a remote operator 126 and/or ground control facility via the display 136.

In embodiments, the UAM system 100 may encode the transport plan 118 generated for each requesting passenger 114 according to one or more visual encoding schemes (e.g., barcode, Quick Reference (QR), ArUCo, color-based encoding, multi-code encoding). For example, the resulting encoded transport plan 138 may include a two-dimensional matrix code or sequence of two or more codes provided to a passenger device 116 verified as belonging to or under control of the requesting passenger 114. If the passenger 114 is not in possession or control of a suitable passenger device 116, a hard copy (140) of the encoded transport plan 138 may be provided. In embodiments, the passenger 114 may gain access to the UAM system 100 by presenting the encoded transport plan 138 (e.g., via the passenger device 116) to a reader device 106. For example, the reader device 106 may be located at an origin port 108. In embodiments, presenting an encoded transport plan 138 for scanning and decoding by a reader device 106 at an origin port 108 may allow the passenger 114 to be admitted to the origin port, verifying the identity of the passenger 114 (e.g., which may include additional security procedures). For example, the UAM system 100 may further confirm the presence of the passenger 114 at their designated origin port 108 based on a scan of their assigned encoded transport plan 138 by a reader device at the origin port. In some embodiments, the reader device 106 may decode all or a portion of the encoded transport plan 138 for use within the origin port 108. For example, the passenger 114 may be provided (e.g., via the passenger device 116 and/or a display screen of the reader device 106) with directions 142 to their assigned UAS 110 (e.g., to a gate where said UAS may be boarded). Further, by decoding the encoded transport plan 138, the reader device 106 may provide ground control data 144 relevant to the transport of the passenger 114 according to the flight plan 118*a*. For example, ground control data 144 may be provided to ground support crew at the origin port 108. In embodiments, ground control data 144 may include updated status, weight/balance, maintenance information with respect to the UAS 110, updated weather/wind information, and any other like data which may assist the ground support crew in preparing the UAS 110 for its scheduled departure.

In some embodiments, the passenger 114 may present the encoded transport plan 138 for scanning/decoding by a reader device 106*a* at a gate within the origin port 108 to gain access to the UAS 110. For example, the scanning and decoding of the encoded transport plan 138 by the reader device 106*a* may once again verify the identity of the passenger 114 and confirm that the passenger has boarded the correct UAS 110 and is occupying their assigned seat 134. In some embodiments, the passenger 114 may be presented with messages, PaxEx information 132, or IFE content via the display 136 assigned to their seat 134 once their boarding is confirmed throughout the UAM system 100. For example, the display 136 may include a camera oriented toward the seat 134, allowing the passenger 114 and remote operator 126 (or other ground-based personnel which whom the passenger may communicate) to see each other while conversing.

In embodiments, the reader device 106*a* may decode the encoded transport plan 138 to obtain the flight plan 118*a* generated for the requesting passenger 114 and thereby upload to the control system 130 of the UAS 110 any routing data 120, configuration data 122, and communications data 124 necessary for transport of the passenger according to the flight plan. Accordingly, the control system 130 may distribute relevant information to any onboard systems or subsystems requiring operating data from the transport plan 118. For example, if other passengers are aboard the UAS 110 at the time the requesting passenger 114 boards the UAS, the control system 130 may modify the flight plan 118*a* assigned to the passenger (or the flight plan to be followed by the UAS generally) based on new information provided by the encoded transport plan 138 as described in greater detail below.

In embodiments, on arrival at the destination port 112, the passenger 114 may present the encoded transport plan 138 for scanning/decoding by a reader device 106*b* at the destination port. For example, the reader device 106*b* may confirm for the UAM system 100 that the passenger 114 has arrived at their intended destination and is preparing to exit the UAM system, and that the transport plan 118 has been fulfilled. Further, the passenger 114 may be provided with additional information (e.g., via a display screen of the reader device 106*b* or via the passenger device 116) relevant to the destination port 112 and its vicinity, e.g., available ground transportation, lodging options, local attractions.

In some embodiments, the scanning or decoding of the encoded transport plan 138 by a reader device 106, 106*a* (signaling the entry of the passenger 114 into the UAM system 100) may trigger a feasibility check or data validation to ensure that a previously generated transport plan 118 may still be fulfilled as generated, or if modifications to the transport plan are necessary. For example, if a transport plan 118 is generated some time in advance of the arrival of the passenger 114 at the origin port 108 and/or the assigned UAS 110, the UAM system 100 may verify that the UAS is or will be at the correct origin port 108, and will be suitably configured to transport the passenger (e.g., power supply is sufficient, seat 134 assigned to the passenger is unoccupied, UAS is free of mechanical issues hindering or precluding its operation).

In some embodiments, the previously generated transport plan 118 may no longer be viable. For example, a previously requested UAS 110 or seat may no longer be available, or a previously requested flight path 118*a* must be rescheduled.

Further, the passenger 114 may wish to modify one or more aspects of a previously requested transport plan 118, e.g., different seating or amenities, different UAS 110, additional or fewer stops, different destination. In some embodiments, the reader device 106 may receive a change request 146 from the passenger device 116. For example, the change request 146 may be initiated by the passenger 114 and propose one or more modifications to the transport plan 118. Further, some or all of the proposed modifications may be accepted by the UAM system 100 and reflected in a modified encoded transport plan 138a provided to the passenger device 116 (or otherwise provided to the passenger 114, e.g., via hard copy 140 including updated codes for some or all aspects of the revised transport plan), e.g., by the reader device 106 at the origin port 108.

In some embodiments, the change request 146 may be initiated by the UAM system 100 via the reader device 106, e.g., due to contingencies or changing conditions that may require modification of the original transport plan 118. For example, the reader device 106 may prompt the passenger 114/passenger device 116 to accept or reject each of a series of proposed modifications. Any accepted modifications to the original transport plan 118 may be reflected in the modified encoded transport plan 138a provided to the passenger device 116.

Figure 2:
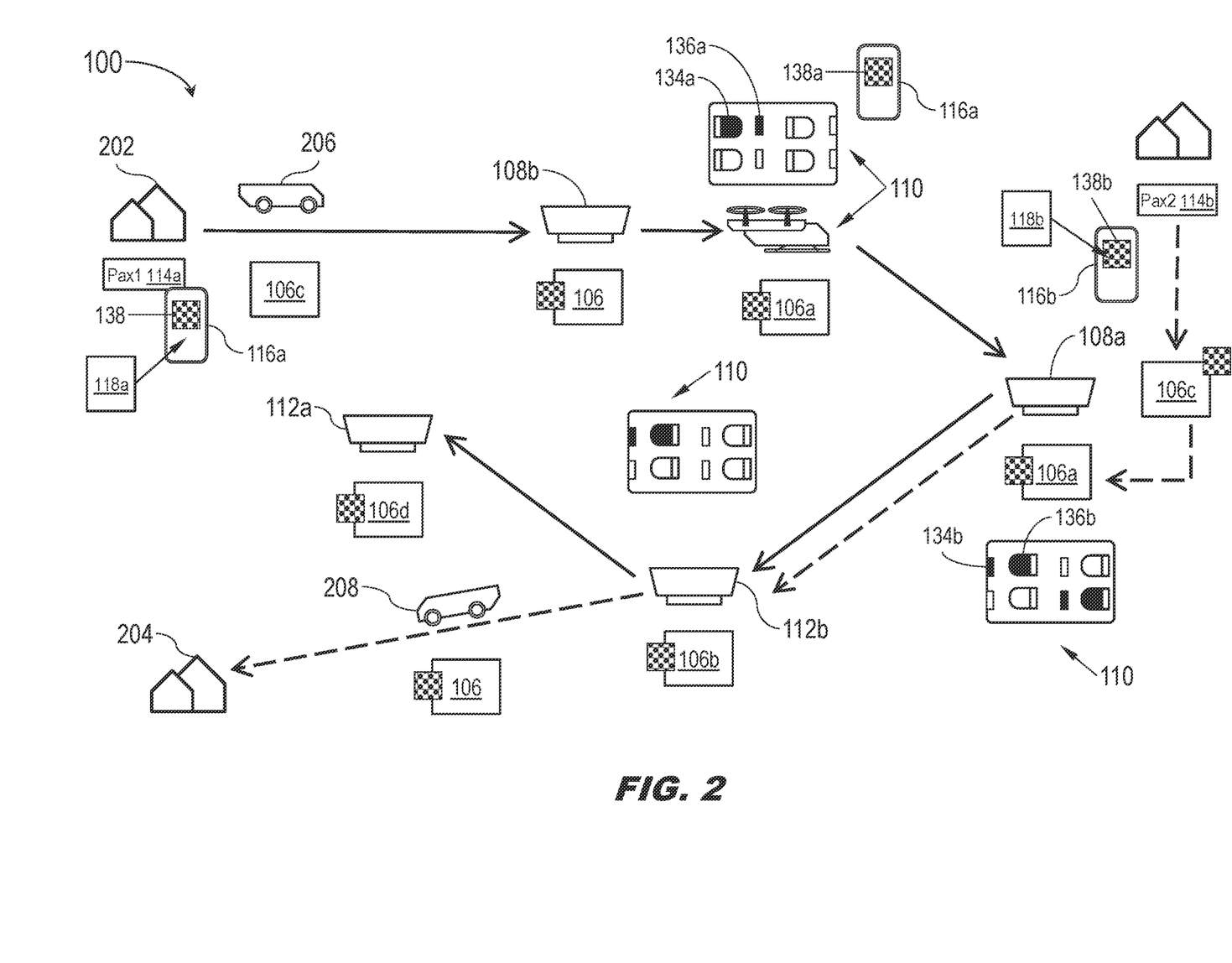
FIG. 2 is a diagrammatic illustration of operations of the UAM system of FIG. 1.

Referring to FIG. 2, the UAM system 100 is shown.

In embodiments, a feasibility check or data validation may result in modification (138a) by the UAM system 100 of one or more transport plans (118, FIG. 1) and/or encoded transport plans 138, FIG. 1 generated for multiple passengers 114a, 114b moving through the UAM system 100. Further, transport plans 118 and encoded transport plans 138 may seamlessly extend the UAM system 100 beyond the boundaries of origin ports (108, FIG. 1), destination ports (112, FIG. 1), and purpose-built vertiports and/or like dedicated ground control facilities generally. For example, the passenger 114a (Pax1) may submit a request for transport from point at or near their residence 202 to a destination port 112a. Similarly, the passenger 114b (Pax2) may submit a request for transport from the origin port 108a to a destination point at or near a residence 204.

In embodiments, the UAM system 100 may generate a transport plan 118 providing for ground transportation 206 of the passenger 114a from the residence 202 to the origin port 108b, and airborne transportation via the UAS 110 from the origin port 108b to the destination port 112a. If, for example, the passenger 114b submits their request after the passenger 114a, the UAM system 100 may generate for the passenger 114b a transport plan 118 providing for airborne transportation via the UAS 110 from the origin port 108a to the destination port 112a; being aware of the prior transportation plan generated for the passenger 114a, the UAM system 100 may assign the UAS 110 to transport both passengers, routing the passenger 114b to the residence 204 via the destination port 112b and ground transportation 208. The UAM system 100 may generate transport plans 118 and encoded transport plans 138, 138b based on the respective transport plans for the passengers 114a, 114b, distributing each encoded transport plans to the passenger devices 116a, 116b carried by each passenger. In embodiments, the origin ports 108a, 106b and the destination ports 112a, 112b may be substantially identical purpose-built vertiports configured for arrivals and departures of the UAS 110 and distinguished as origin or destination ports only with respect to the routing of the passengers 114a, 114b through the UAM system 100.

In embodiments, the passenger 114a may present the encoded transport plan 138 (via the passenger device 116a) to a reader device 106c inside the ground transportation 206. For example, the reader device 106c may communicate to the UAM system 100 that the passenger 114a has entered the UAM system, which may trigger a validation of the associated transport plan 118a. The UAM system may determine that the UAS 110 is located at the origin port 108b and is prepared to transport the passenger 114a as provided for by the transport plan 118a, but that it may be optimal to route the passenger 114a through the origin port 108a and destination port 112b in order that the UAS 110 may accommodate both passengers 114a, 114b. The transport plan 118a and/or encoded transport plan 138 may be modified (138a) at the initiation of the UAM system 100 and re-sent to the passenger device 116a prior to arrival at the origin port 108b, e.g., along with an explanation of any necessary changes to the transport plan and an opportunity for the passenger 114a to accept changes or modify their original request.

In embodiments, the ground transportation 206 may transport the passenger 114a to the origin port 108b, wherein the passenger may again present the encoded transport plan 138 for scanning by the reader device 106 to gain access to the origin port. For example, if the transport plan 118a and/or encoded transport plan 138 have been modified by the UAM system 100, the passenger 114a may alternatively receive the modified encoded transport plan 138a once they have entered the origin port 108b (e.g., via secure wireless link with the passenger device 116a). Further, once inside the origin port 108b the passenger 114a may be provided with directions to the UAS 110, e.g., to a gate within the origin port where the UAS may be boarded. In some embodiments, the modified encoded transport plan 138a may, additionally or alternatively, reflect modifications based on passenger-initiated change requests (146, FIG. 1).

In embodiments, the passenger 114a may present the modified encoded transport plan 138a for scanning/decoding by a reader device 106a proximate to the UAS 110, e.g., either at the gate adjacent to the UAS or onboard the UAS. The reader device 106a may confirm that the passenger 114a is aboard the UAS 110, direct the passenger 114a to their assigned seat 134a, provide PaxEx information (132, FIG. 1) via the associated display 136a, and distribute routing, configuration, and communications data (120/122/124, FIG. 1) from the modified encoded transport plan 138a to the control system (130, FIG. 1) and subsystems of the UAS 110 as needed to prepare the UAS for departure.

In embodiments, the UAS 110 (with the passenger 114a aboard) may arrive at the origin port 108a so that the passenger 114b may embark. For example, the passenger 114b may present their encoded transport plan 138b (via passenger device 116b) to the reader device 106d to gain access to the origin port 108a, and so the reader device 106b may update the UAM system 100 to the arrival of the passenger 114b and direct them to the UAS 110 for boarding. In embodiments, the passenger 114b may again present the encoded transport plan 138b for scanning/decoding by the reader device 106a aboard the UAS 110 (e.g., or a like reader device at the origin port 108a adjacent to the UAS) to confirm their presence aboard the UAS and be directed to their assigned seat 134b and display 136b.

In embodiments, the UAM system 100 may modify the transport plan 118a via which the UAS 110 is transporting the passenger 114a in light of new information received from the encoded transport plan 138b presented to the reader device 106c/106a by the passenger 114b. For example, the encoded transport plan 138b may include routing, configuration, and communications data 120/122/124 for routing the UAS 110 to the destination port 112*b* en route to the destination port 112*a* (e.g., the original destination of the passenger 114*a*).

In embodiments, the UAS 110 may travel to the destination port 112*b*, where the passenger 114*b* may disembark. For example, the passenger 114*b* may present their encoded transport plan 138*b* for scanning/decoding by the reader device 106*b* at the destination port 112*b*. The UAM system 100 may confirm based on the scanning/decoding that the passenger 114*b* has arrived at the destination port 112*b*, and may provide directions to ground transportation 208 via which the passenger may be transported to their final destination, e.g., the residence 204. If, for example, a reader device 106 is provided aboard the ground transportation 208, the passenger 114*b* may present their encoded transport plan 138*b* for scanning upon disembarkation at the residence 204, indicating their final departure from the UAM system 100 and the fulfillment of the transport plan 118*b*.

In embodiments, the UAS 110 may depart the destination port 112*b* with the passenger 114*a* aboard and land again at the destination port 112*a*. For example, at the destination port 112*a* the passenger 114*a* may disembark and present the modified encoded transport plan 138*a* for scanning/decoding by the reading device 106*d*, whereby the UAM system 100 may be updated as to the fulfillment of the transport plan 118*a*.

Figure 3A:
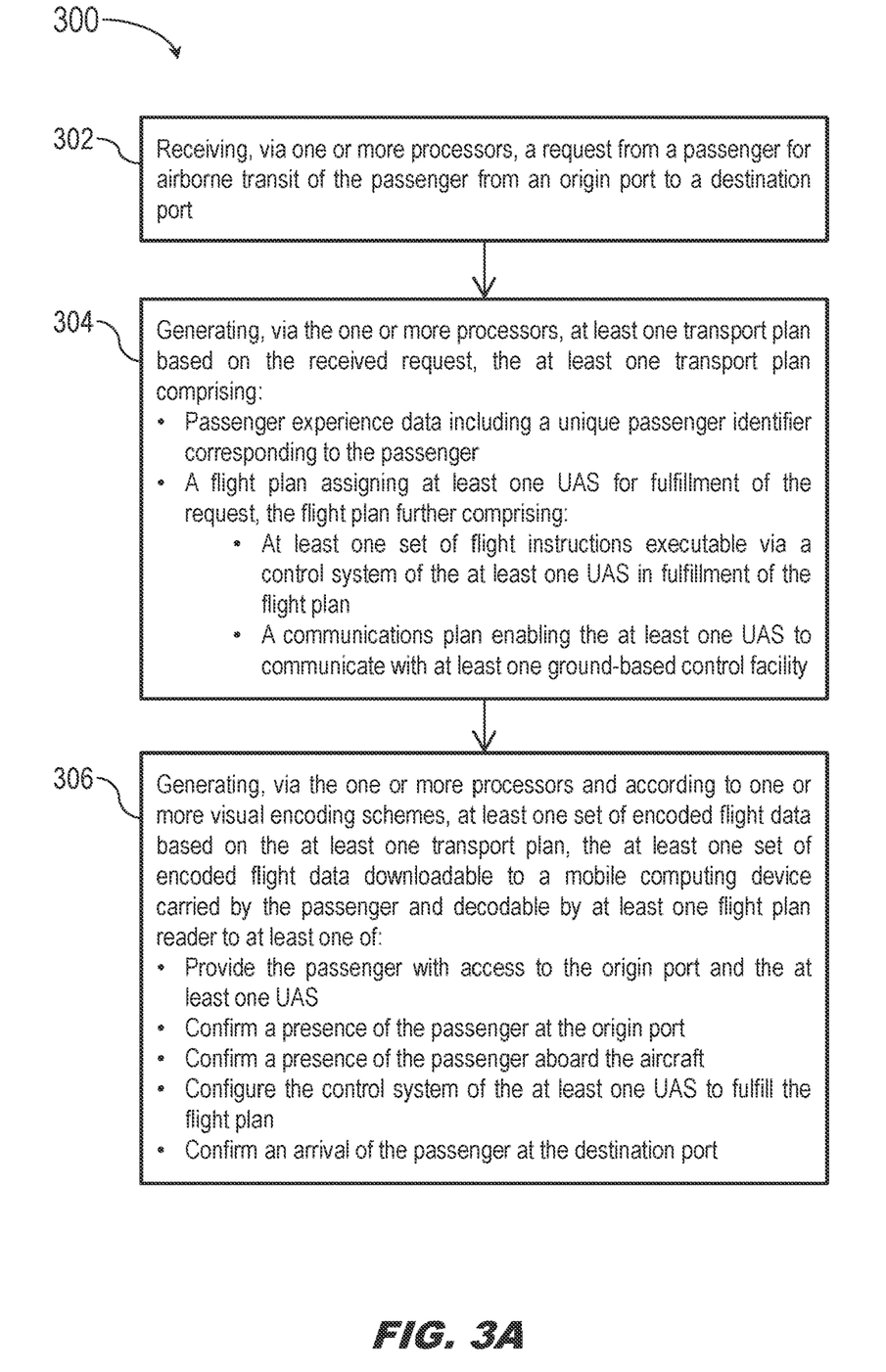
FIGS. 3A and 3B are flow diagrams illustrating a method for encoding access control and data transfer within a UAM system according to example embodiments of this disclosure.

Referring now to FIG. 3, the method 300 may be implemented by the UAM system 100 and may include the following steps.

At a step 302, the UAM system receives a passenger request for airborne transit through the UAM system (e.g., via one or more UAS) from an origin port to a destination port. In some embodiments, the request may include ground transportation to or from an origin or destination port, e.g., to some other pickup or drop-off point.

At a step 304, the UAM system generates a transport plan based on the passenger request. For example, the transport plan may assign one or more UAS to transport the passenger along the desired route, including a flight plan for the assigned UAS along with flight instructions executable by the UAS control system (e.g., by an onboard pilot, by a remote operator of the UAS, by an autonomous UAS control system), a communications plan providing for communications links inflight between the UAS and ground control facilities. In some embodiments, the transport plan additionally includes passenger experience (PaxEx) data uniquely identifying the passenger and including any relevant information about passenger preferences or needs (e.g., seating, dietary restrictions, device connectivity, accessibility) inflight.

At a step 306, the UAM system generates an encoded transport plan unique to the passenger and embodied in a set of matrix codes according to one or more visual encoding schemes, the matrix codes decodable by reader devices (e.g., at the origin and destination ports, aboard or adjacent to the UAS). For example, presenting the encoded transport plan for scanning grants the passenger access to the origin port and the UAS. Further, scanning the encoded transport plan confirms the presence of the passenger at the proper point in the UAS system (e.g., at the origin port prior to departure, aboard the UAS so departure may commence, arrived at the destination port, the transport plan fulfilled). Further still, a reader device decoding the encoded transport plan may obtain necessary routing, configuration, and communications data for the UAS to transport the passenger, distributing the obtained information to the UAS control system and aircraft subsystems as needed. In some embodiments, the encoded transport plan includes seat assignments, safety instructions, and passenger confidence information, e.g., that accommodations aboard the UAS match or align with the passenger's original transport request. In some embodiments, the transport plan (and encoded transport plan) includes instructions and relevant information for ground support crew at the origin port or destination port, e.g., weight/balance and maintenance data for the UAS.

Figure 3B:
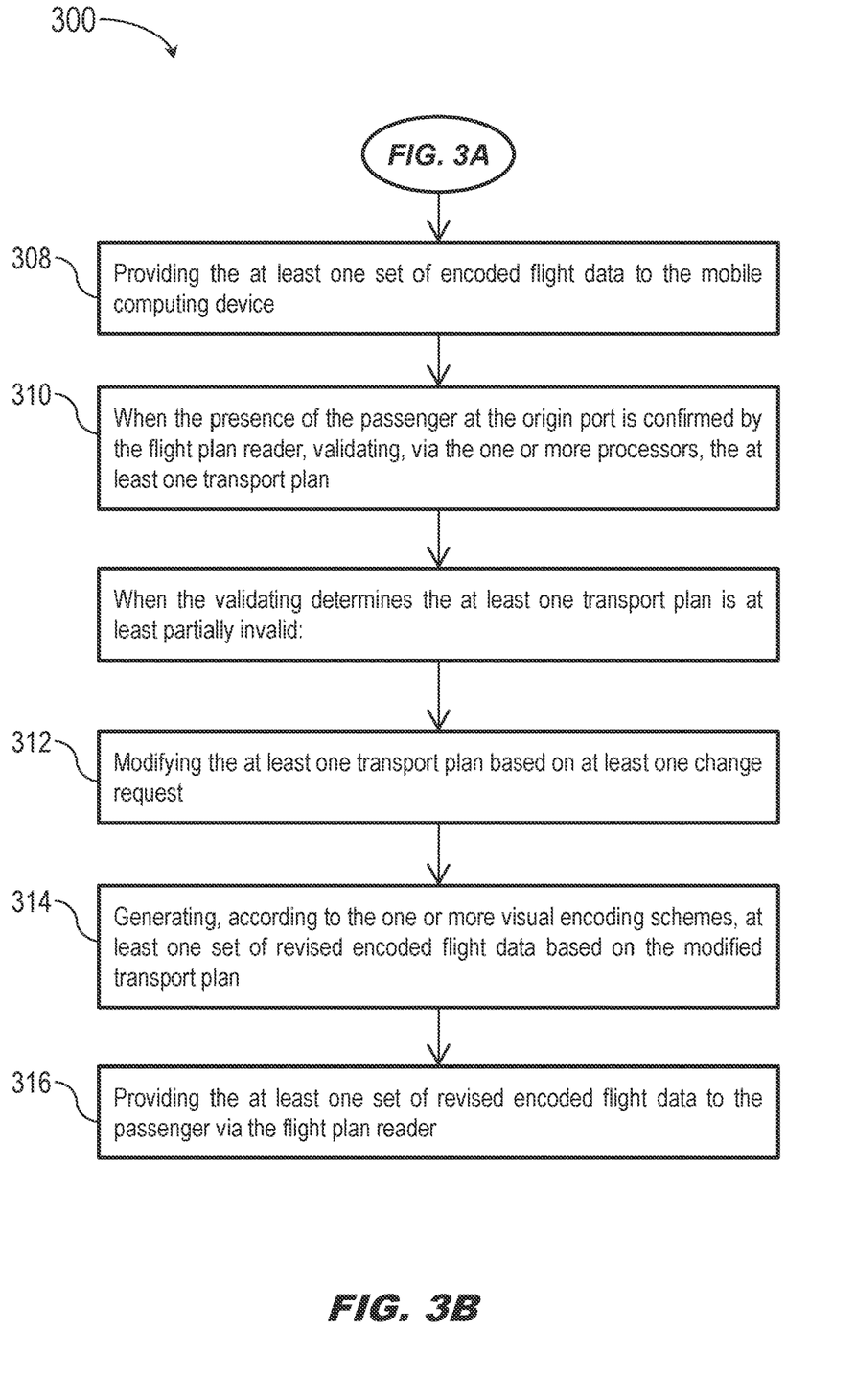

Referring also to FIG. 3B, at a step 308, the UAM system provides the encoded transport plan to a passenger device carried by the requesting passenger.

In some embodiments, the method 300 may include an additional step 310. At the step 310, when the passenger's presence is confirmed at the origin port (e.g., via the flight plan reader), the UAM system reviews and validates the transport plan to ensure that all aspects of the plan may still be fulfilled, e.g., origin, destination, departure and arrival times, flight plan, seating assignments.

In some embodiments, the method 300 may include additional steps 312 through 316. For example, when the validation determines that the transport plan is at least partially invalid (e.g., that one or more aspects of the transport plan cannot be fulfilled as provided for by the original transport plan, due to weather patterns, aircraft maintenance issues, or other changing conditions or circumstances), at the step 312 the UAM system modifies the transport plan based on one or more change requests. For example, the passenger may submit a change request (e.g., via their portable computing device or via the flight plan reader device at the origin port), or the UAM system may initiate a change request on its own based on a flight plan validation or information indicative of changing circumstances that may invalidate one or more aspects of the flight plan.

At a step 314, the UAM system generates a revised set of encoded flight data based on the modified transport plan. For example, a new set of codes may be generated for the revised encoded flight plan data as a whole, or replacement codes may be generated for those aspects of the transport plan that have been modified, e.g., a new route, new flight path, new seating assignment, new operating instructions.

At the step 316, the UAM system provides the revised set of encoded flight plan data to the passenger. For example, the UAM system may send new or revised encoded flight plan data directly to the passenger's portable computing device, or to the flight plan reader at the origin port (where, e.g., the passenger may download new encoded flight plan data or receive the new or replacement codes as hard copies).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A method for transporting passengers via an urban air mobility (UAM) system, comprising:
   receiving, via one or more processors, a request from a passenger for airborne transit of the passenger from an origin port to a destination port, wherein each of the origin port and the destination port includes one of an airport or a vertiport configured for departures and arrivals of at least one uncrewed aircraft system (UAS) of the UAM system;
   generating, via the one or more processors, at least one transport plan based on the received request, the at least one transport plan comprising:
      passenger experience data including a unique passenger identifier corresponding to the passenger; and
      a flight plan assigning at least one UAS for fulfillment of the request, the flight plan further comprising:
      at least one set of flight instructions executable via a control system of the at least one UAS in fulfillment of the flight plan; and
      a communications plan enabling the at least one UAS to communicate with at least one ground-based control facility;
   generating, via the one or more processors and according to one or more visual encoding schemes, at least one set of unique encoded flight data based on the at least one transport plan, the at least one set of unique encoded flight data downloadable to a mobile computing device carried by the passenger and decodable by at least one flight plan reader to at least one of:
      confirm a presence of the passenger at the origin port;
      configure the control system of the at least one UAS to fulfill the flight plan;
      or
      confirm an arrival of the passenger at the destination port;
   providing the at least one set of unique encoded flight data to the mobile computing device; and
   operating the at least one UAS according to the flight plan via at least one of a remote operator or an onboard control system.

2. The method of claim 1, wherein the flight plan further comprises:
   at least one set of ground instructions associated with a ground support crew at one or more of the origin port or the destination port.

3. The method of claim 2, wherein the at least one set of ground instructions includes one or more of:
   maintenance data associated with the at least one UAS; or
   weight and balance data associated with the at least one UAS.

4. The method of claim 1, wherein:
   the at least one transport plan further comprises a ground transport plan configured for at least one of 1) transporting the passenger from a pickup point to the origin port or 2) transporting the passenger from the destination port to a drop-off point via at least one ground vehicle, the ground transport plan comprising at least one set of flight instructions executable via a control system of the at least one ground vehicle; and
   wherein the at least one set of unique encoded flight data is decodable by at least one ground transport reader to at least one of:
      provide the passenger with access to the at least one ground vehicle;
      confirm a presence of the passenger aboard the at least one ground vehicle;
      configure the control system of the at least one ground vehicle to fulfill the ground transport plan; or
      confirm an arrival of the passenger at the drop-off point.

5. The method of claim 1, wherein the at least one set of flight instructions is executable by a remote operator of the at least one UAS via at least one wireless link between the remote operator and the control system.

6. The method of claim 1, wherein:
   the at least one UAS is a fully autonomous UAS; and
   wherein the at least one set of flight instructions is executable by at least one onboard processor of the control system.

7. The method of claim 1, wherein the passenger experience data includes:
   at least one seat assignment corresponding to a seating area aboard the at least one UAS, the seating area including a display screen.

8. The method of claim 1, further comprising:
   when the presence of the passenger at the origin port is confirmed by the flight plan reader, validating, via the one or more processors, the at least one transport plan.

9. The method of claim 8, further comprising, when the validating determines the at least one transport plan is at least partially invalid:
   modifying the at least one transport plan based on at least one change request;
   generating, according to the one or more visual encoding schemes, at least one set of revised encoded flight data based on the modified transport plan; and
   providing the at least one set of revised encoded flight data to the passenger.

10. A system for encoding access control for urban air mobility (UAM) operations, the system comprising:
    a controller including:
       a memory for storing processor-executable instruction sets; and
       one or more processors configurable by the instruction sets for:
          receiving a request from a passenger, the request associated with transporting the passenger from an origin port to a destination port, wherein each of the origin port and the destination port includes one of an airport or a vertiport configured for departures and arrivals of at least one uncrewed aircraft system (UAS) of a UAM system;
          generating, based on the request, a transport plan comprising:
             passenger experience data including a unique passenger identifier corresponding to the passenger; and
             a flight plan assigning at least one UAS for fulfillment of the request, the flight plan further comprising:

at least one set of flight instructions executable via at least one of a remote operator or an onboard control system of the at least one UAS in fulfillment of the flight plan; and a communications plan enabling the at least one UAS to communicate with at least one ground-based control facility;

providing the flight plan to the at least one of the remote operator or the onboard control system; and generating, according to one or more visual encoding schemes, at least one set of unique encoded flight data based on the at least one transport plan, the at least one set of unique encoded flight data downloadable to a mobile computing device carried by the passenger;

and at least one flight plan reader configured for decoding the at least one set of unique encoded flight data for at least one of:

confirming a presence of the passenger at the origin port;

configuring the control system of the at least one UAS to fulfill the flight plan;

or confirming an arrival of the passenger at the destination port.

11. The system of claim 10, wherein the flight plan further comprises:

at least one set of ground instructions associated with a ground support crew at one or more of the origin port or the destination port.

12. The system of claim 11, wherein the at least one set of ground instructions includes one or more of:

maintenance data associated with the at least one UAS; or weight and balance data associated with the at least one UAS.

13. The system of claim 10, wherein:

the at least one transport plan further comprises a ground transport plan configured for at least one of 1) transporting the passenger from a pickup point to the origin port or 2) transporting the passenger from the destination port to a drop-off point via at least one ground vehicle, the ground transport plan comprising at least one set of flight instructions executable via a control system of the at least one ground vehicle;

and wherein the at least one set of unique encoded flight data is decodable by at least one ground transport reader to at least one of:

provide the passenger with access to the at least one ground vehicle;

confirm a presence of the passenger aboard the at least one ground vehicle;

configure the control system of the at least one ground vehicle to fulfill the ground transport plan;

or confirm an arrival of the passenger at the drop-off point.

14. The system of claim 10, wherein the at least one set of flight instructions is executable by a remote operator of the at least one UAS via at least one wireless link between the remote operator and the control system.

15. The system of claim 10, wherein:

the at least one UAS is a fully autonomous UAS;

and wherein the at least one set of flight instructions is executable by at least one onboard processor of the control system.

16. The system of claim 10, wherein the passenger experience data includes:

at least one seat assignment corresponding to a seating area aboard the at least one UAS, the seating area including a display screen.

17. The system of claim 10, wherein the controller is configured for, when the presence of the passenger at the origin port is confirmed, validating, via the one or more processors, the at least one transport plan.

18. The system of claim 17, wherein the controller is configured for:

when the validating determines the at least one transport plan is at least partially invalid:

modifying the at least one transport plan based on at least one change request;

generating, according to the one or more visual encoding schemes, at least one set of revised encoded flight data based on the modified transport plan;

and providing the at least one set of revised encoded flight data to the passenger via the flight plan reader.

* * * * *